United States Patent [19]
Fuhrmann et al.

[11] Patent Number: 5,978,462
[45] Date of Patent: Nov. 2, 1999

[54] METHOD AND SYSTEM FOR AUTOMATING UPDATES TO SUBSCRIBER SERVICE ACCOUNTS TO ACCOMMODATE NUMBERING PLAN AREA SPLITS

[75] Inventors: Barbara J. Fuhrmann; Melanne Jane Miller, both of Cedar Rapids, Iowa

[73] Assignee: MCI Communications Corporation, Washington, D.C.

[21] Appl. No.: 08/947,142

[22] Filed: Oct. 8, 1997

[51] Int. Cl.[6] .............................. H04M 3/42; H04M 15/00
[52] U.S. Cl. .......................... 379/201; 379/115; 379/220; 379/219; 379/120
[58] Field of Search ..................................... 455/418, 414, 455/406, 408, 403, 422, 446; 379/127, 125, 126, 120, 115, 114, 142, 211, 213, 201, 280, 284, 286, 289, 912, 219, 220

[56] References Cited

U.S. PATENT DOCUMENTS

| | | | |
|---|---|---|---|
| 4,924,495 | 5/1990 | Richards et al. | 379/127 |
| 5,579,376 | 11/1996 | Kennedy, III et al. | 455/433 |
| 5,619,562 | 4/1997 | Maurer et al. | 379/201 |
| 5,761,291 | 6/1998 | Dalton | 379/220 |
| 5,771,284 | 6/1998 | Sonnenberg | 379/220 |
| 5,815,808 | 9/1998 | Valentine | 455/414 |
| 5,835,580 | 11/1998 | Fraser | 379/115 |
| 5,848,144 | 12/1998 | Ahrens | 379/220 |

*Primary Examiner*—Dwayne D. Bost
*Assistant Examiner*—Tracy M. Legree

[57] ABSTRACT

A method and system for automatically updating subscriber service accounts to accommodate a numbering plan change, such as an NPA split, is provided. Subscriber service account information, such as account information pertaining to speed dialing, is automatically updated by a subscriber account update process, which runs periodically on an administrative computer system connected to an ISN via a wide area network. The subscriber account update process accesses NPA split tables to determine pending NPA splits. For each pending NPA split, the update process determines impacted ANIs that have existing service accounts. Then, for each such impacted ANI, the update process creates a new service account, which is indexed by the new ANI, to which the impacted ANI is being converted. The new service account includes account information previously stored in the existing account. The existing account is updated to refer to the new account. In this way, a subscriber having an impacted ANI can access the subscriber's service account using either the impacted ANI or the new ANI during the permissive dialing period. In addition, the update process deletes obsolete service accounts a certain period of time after the mandatory dialing period of an NPA split has begun. The updated service account records are automatically stored in the accounts database and are replicated and distributed throughout the ISN to NIDS servers using a data replication and distribution system.

25 Claims, 9 Drawing Sheets

METHOD AND SYSTEM FOR AUTOMATING UPDATES TO SUBSCRIBER SERVICE ACCOUNTS TO ACCOMMODATE NUMBERING PLAN AREA SPLITS

TECHNICAL FIELD

The present invention relates generally to telephone call processing and, more particularly, to automatically updating ANI-based subscriber service accounts to accommodate NPA splits.

BACKGROUND OF THE INVENTION

Many telecommunications networks provide services on a subscription basis. A subscriber to a subscription service has an account with the telecommunications service provider that provides the service. The account provides access to service-specific data, customer authorization and billing information, and other information. A subscriber's account is automatically accessed by the service provider's telecommunications network when the subscriber indicates a desire to use the service.

For example, MCI, a large telecommunications carrier, offers a subscription-based speed dialing service. In response to entry of a shortcut code, the speed dialing service automatically dials an associated telephone number, which is retrieved from the subscriber's account. Before using the speed dialing service, the subscriber specifies pairs of a shortcut code and a corresponding destination telephone number, which are stored by the service in the subscriber's account. A shortcut code is typically a single- or double-digit Dual Tone Multiple Frequency ("DTMF") signal, typically sent by pressing buttons on a touch-tone telephone. Once the speed dialing information is specified, the speed dialing subscriber service provides a sort of "memory" for dialing phone numbers frequently called, which operates independent of the physical device used to dial the destination number. Speed dialing is particularly useful, for example, for dialing long numbers greater than ten-digit telephone numbers, such as international telephone numbers, which cannot be stored in the local memory of many telephony devices.

In a typical implementation of a subscription service, the account information, such as the speed dial destination numbers, are stored in a subscriber account that is specific to each subscriber. It is possible for multiple subscription service s to be provided for a single account. Commonly, access to the account is achieved using the subscriber's ANI. An "ANI" is an automatic number identifier, which identifies the telephone number that is assigned to the calling station that originated the telephone call. An ANI is sent with every telephone call made from a calling station, and thus identifies the "caller" of a telephone call.

During typical operation, a subscriber dials into the subscription service account using a specially designated telephone number, such as a toll-free 800/888 telephone number. The subscriber then provides a personal identification number ("PIN") to authorize access to the subscriber's account. The telecommunications network that provides the service accesses the subscriber's account information using the subscriber's ANI, which is passed with the telephone call information.

FIG. 1 is an overview block diagram of the architecture of an example telecommunications network used to provide a subscription-based service such as speed dialing. An intelligent services network ("ISN") 103, commonly known as a call center, provides operator services and other enhanced services, such as subscription-based services, through various electronic devices and computer systems. The ISN 103 is connected to a customer's telephony device 101 through a switching network, such as an external public switched telephone network ("PSTN") 102. The PSTN 102 is connected to the originating telephony device 101 typically by a local exchange carrier ("LEC"), which is not shown.

The ISN 103 includes a number of different client devices, such as one or more audio response units (ARUs) 105, one or more application processors (APs) 108, and various operator consoles 109, which are connected through an Automated Call Distributor (ACD) 104 to the PSTN 102. The components of the ISN 103 are typically interconnected through a local area network ("LAN"), such as an Ethernet LAN 113. The various components of the ISN 103 are used to provide high-level services to telephone customers that access the ISN 103 via the PSTN 102. For example, the operator consoles 109 are used to respond to requests for operator-assisted calls. Similarly, an ARU 105 is used to provide an automated service such as a scripted menu-driven service that is controlled by a customer using a touch-tone telephone. The ISN 103 client devices utilize one or more Network Information Distribution System ("NIDS") servers 110 to store database information, such as the subscription-based service accounts. Typically, the subscription service accounts are created, stored, and managed on a computer system (such as mainframe 111) which uses a data replication and distribution system to distribute, via a token ring wide area network ("WAN") 112, account data to the various NIDS servers 110, which are geographically spread throughout the ISN.

To use the speed dialing service provided by ISN 103, a telephone call (a call) originates from the calling station 101 by dialing the specially designated telephone number. The call is routed by the switching network through the PSTN 102 to the ISN 103 to process the call. The call is received by the Automated Call Distributor (ACD) 104, which routes the call based on the specially designated telephone number to the ARU 105. The ARU 105 processes the subscriber's request and, in doing so, retrieves the subscriber's service account record(s) from one of the NIDS servers 110. The ARU 105 then provides the requested service to the subscriber.

More specifically, the ARU 105 includes a Network Audio Server ("NAS") 106 and an automated call processor ("ACP") 107. The ACP 107 performs application processing and provides instructions to the NAS 106. The NAS 106 is equipped with telephony ports and can receive telephone calls, such as those sent from the ACD 104. The NAS provides a scripted menu (for example, "Press 1 to access your speed dial account; press 2 to change account information . . . "). The NAS 106 accepts caller input via DTMF signals. Once the ARU 105 receives the call that is requesting speed dialing, the subscriber enters a PIN to authorize access to the subscriber's account. The ARU 105 uses the subscriber's ANI, which was passed by the PSTN 102 through the ACD 104 to the ARU 105, to retrieve the subscriber's account records from one of the NIDS servers 110. The ARU 105 through the NAS 106 obtains the subscriber's shortkey selection and then retrieves the corresponding destination telephone number from the speed dialing information stored in the retrieved account records. The ARU 105 then initiates a telephone call request to the retrieved destination telephone number on behalf of the subscriber.

Thus, in typical operation, a subscriber's service account is directly tied to the subscriber's ANI. As a result, when the subscriber's ANI is changed, the subscriber service account that corresponds to the affected ANI must be updated to reflect the new ANI. Different phenomena in a telecommunications system may cause an ANI to change. For example, changes to a numbering plan may affect the distribution of ANIs in a geographic area. In North America, a local exchange carrier ("LEC") is responsible for assigning ten-digit telephone numbers within certain numbering plan areas ("NPAs"). An NPA is commonly known as the "area code," which is the first three digits of a terminating ten-digit telephone number according to the North America Numbering Plan. When the LEC runs out of ten-digit telephone numbers within a particular NPA, the LEC must create a new NPA and reassign some of the existing telephone numbers to the new NPA. As a result, many subscribers' ANIs (their telephone numbers) change. The creation of a new NPA and reassignment of telephone numbers is referred to as an NPA split. An NPA split results in interruptions to account-based subscriber services unless the accounts are updated to reflect the ANI changes. Typically, the subscriber service accounts are updated in a manual process, which relies on an order entry system residing on the mainframe 111 to update each record for each subscriber ANI.

The update problem is further complicated when caused by an NPA split because the ANIs serviced by the LEC are not changed immediately at a specified (or known) time. Rather, the LEC changes the various ANIs in the affected NPA region over the course of several weeks or several months. During this period, known as a permissive dialing period, the LEC can originate telephone calls using either the old ANIs or the new ANIs. When the permissive dialing period ends, the mandatory dialing period begins, and the switch is required to originate telephone calls using new ANIs. Because it is impossible for the service provider to know for a particular ANI the exact moment of the ANI cutover from the old ANI to the new ANI, current systems manually change each subscriber's ANI-based accounts using the order entry system when the mandatory dialing period begins. This may result in interruption to the subscriber's service if the subscriber's particular ANI is cutover sometime during the permissive dialing period (before mandatory dialing begins) and the subscriber's account is not updated until the mandatory period begins.

SUMMARY OF THE INVENTION

Exemplary embodiments of the present invention provide methods and systems for automatically updating subscriber service accounts using a subscriber account update process. The subscriber account update process runs periodically to automatically update subscriber service accounts to accommodate numbering plan changes, such as NPA splits. The subscriber account update process tracks pending numbering plan changes and automatically updates telephone number identifier-based service accounts identified by telephone number identifiers that are impacted by the pending numbering plan change. For example, the subscriber account update process can be used to track pending NPA splits and to automatically update service accounts that are indexed by impacted ANIs.

Specifically, when the subscriber account update process determines that a numbering plan change is a pending numbering plan change, then the update process determines each impacted telephone number identifier that identifies an existing subscriber service account. Then, for each such impacted telephone number identifier, the update process determines a corresponding new telephone number identifier; creates a new subscriber service account identified by the new telephone number identifier; retrieves account information from the existing subscriber service account; inserts the retrieved account information into the new subscriber service account; and updates the existing subscriber service account to include a reference to the new subscriber service account. In this manner, a subscriber associated with an impacted telephone number identifier is able to access the subscriber's service account during a permissive dialing period of the pending numbering plan change using either the impacted telephone number identifier or the new telephone number identifier.

In addition, on a periodic basis, the update process determines whether a numbering plan change has begun its mandatory dialing period and, if so, deletes obsolete service accounts associated with that numbering plan change. In this manner, the update process enforces the new telephone number identifier to be used to access a subscriber's service account a certain period of time after the mandatory dialing period associated with that numbering plan change has started.

The numbering plan change information may be stored in a database.

The methods and systems of the present invention may be used to automatically update subscriber service accounts that are used to provide a speed dialing service. In addition, the methods and systems of the present invention may be used to automatically update subscriber service accounts that are used to provide an automated news service. Further, the methods and systems of the present invention may be used to automatically update subscriber service accounts that are used to provide a menu-driven application that is controlled by dual tone multiple frequency signals.

DETAILED DESCRIPTION OF THE INVENTION

Figure 1:
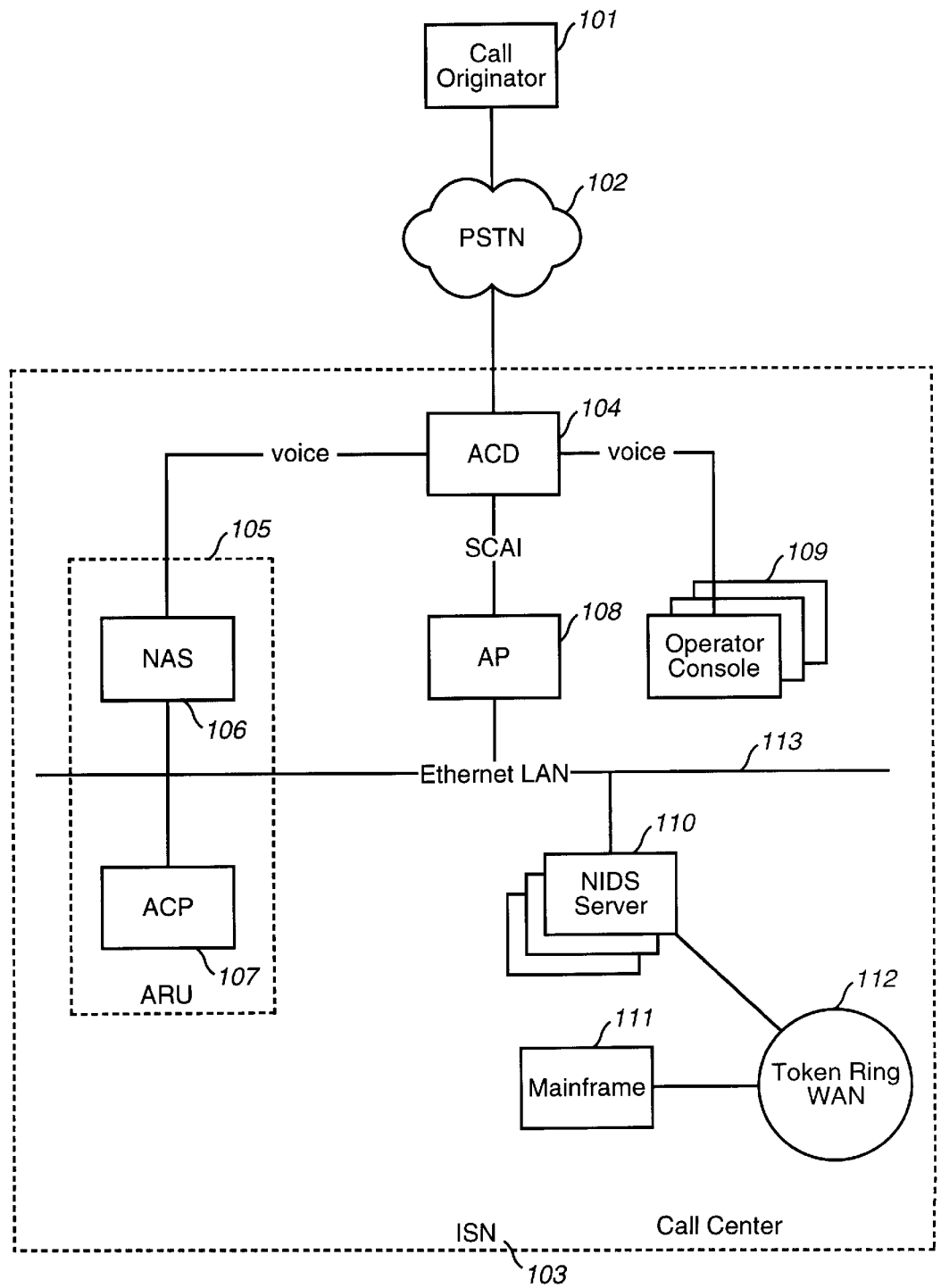
FIG. 1 is an overview block diagram of the architecture of an example telecommunications network used to provide a subscription-based service such as speed dialing.

Exemplary embodiments of the present invention provide methods and systems for automatically updating subscriber service accounts without interruption of the services provided. The automated subscriber service account update system provides a subscriber account update process. The subscriber account update process automatically tracks pending numbering plan changes, such as NPA splits, and automatically updates ANI-based service accounts that are impacted by the pending numbering plan changes so that no interruptions occur in subscriber services.

Although the example numbering plan change discussed is an NPA split, one skilled in the art will recognize that any kind of change to a numbering plan is contemplated by embodiments of the present invention. For example, changes to codes other than area codes may impact telephone numbers in countries that use numbering plans that differ from the North America Numbering Plan. These and other changes to a numbering plan may be addressed by the techniques described herein. Further, although this description refers to ANIs as an example number used by the telecommunications network to uniquely identify each caller and hence each subscriber service account, one skilled in the art will recognize that any type of telephone number identifier could be substituted appropriately as an index to the subscriber service accounts. Further, the techniques described herein are applicable when such telephone number identifiers are changed. In addition, although this description refers to speed dialing as an example subscriber service, one skilled in the art will recognize that any telephone number identifier-based service is contemplated. For example, an ANI-based menu-driven news service could be accommodated by the techniques described here.

The subscriber account update process tracks pending NPA splits using an NPA split table, which identifies permissive and mandatory dialing periods for each NPA split. The subscriber account update process makes changes to a subscriber's account that is indexed by an impacted ANI in a manner that preserves access to the subscriber's account using either the impacted (existing) ANI or the new ANI during the permissive dialing period of the associated NPA split. This procedure results in no interruption of service to the subscriber, regardless of when the ANI cutover actually occurs for the subscriber's impacted ANI. Further, some time after the mandatory period for the associated NPA split begins, the subscriber account update process ensures that the subscriber's service account may only be accessed using the new ANI.

To accomplish these objectives, the subscriber account update process automatically creates, for each impacted ANI that has an existing account, a new account that corresponds to the new ANI that will preside after the NPA split occurs. The subscriber service account that corresponds to the impacted ANI is then updated to refer to the new account. In this manner, during the period of permissive dialing for the NPA split, either the impacted ANI or the new ANI may be used to access the subscriber's account information. The account records created and updated by the update process are stored in an accounts database and are automatically replicated and distributed throughout the telecommunications network to the various NIDS servers.

Figure 2:
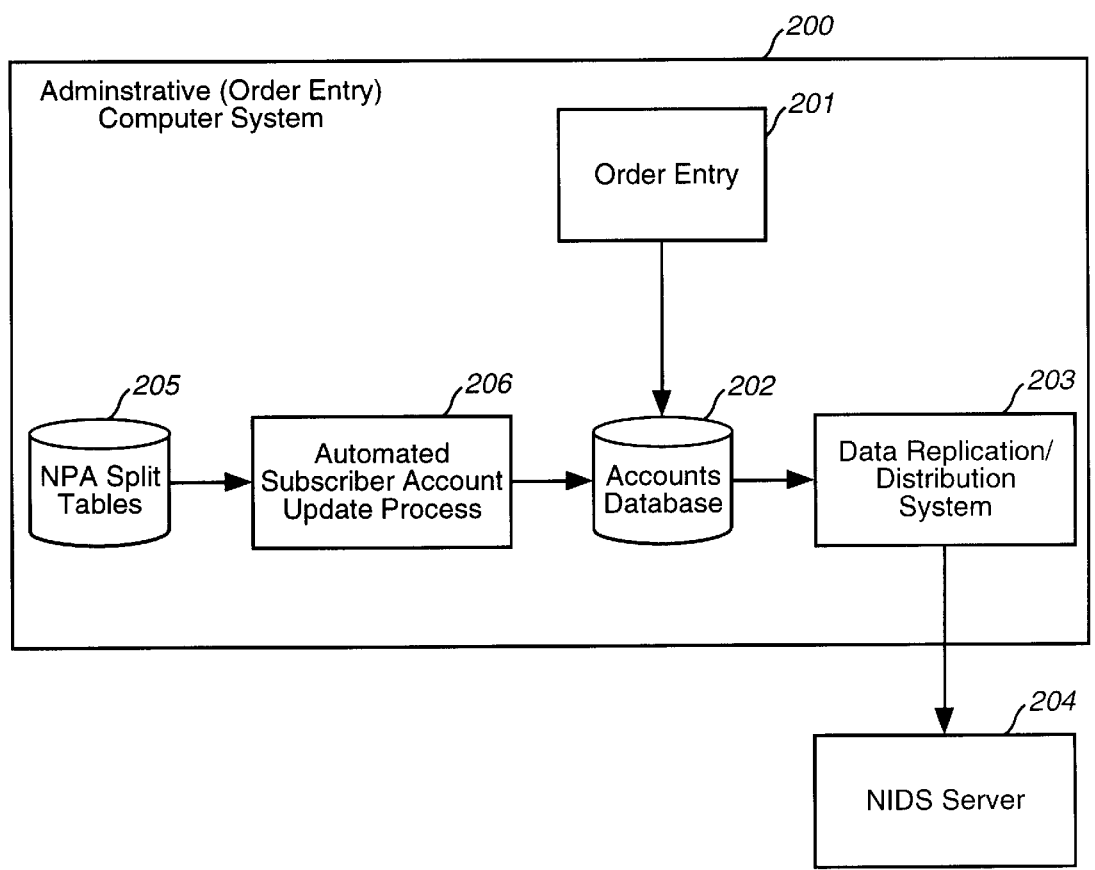
FIG. 2 is an overview block diagram of the components of an administrative computer system used to implement illustrative embodiments of the present invention.

FIG. 2 is an overview block diagram of the components of an administrative computer system used to implement illustrative embodiments of the present invention. An administrative computer system 200 includes a manual order entry system 201, a subscriber accounts database 202, a data replication and distribution system 203, a subscriber account update process 206, and NPA split tables 205. When a subscriber initially subscribes to a service, account information is manually entered via the order entry system 201 into the accounts database 202 to create a service account for the subscriber. The accounts database 202 can be implemented using any well-known database technique. On a periodic basis, the data replication and distribution system 203 copies the account records and distributes them (via a wide area network) to the various NIDS servers 204, which are distributed throughout the telecommunications network.

The automated subscriber account update process 206 is periodically executed to update the accounts database 202 to accommodate pending NPA splits. When executed, the subscriber account update process 206 consults the NPA split tables 205 to determine pending NPA splits and to identify the impacted ANIs that have associated service accounts. Impacted ANIs can be determined, for example, from the three digit sequences following the area code that are impacted by the NPA split. Each three digit sequence represents an "exchange" and is herein referred to as "NXX." The exchanges impacted by each NPA split are stored in the NPA split tables 205. For each impacted ANI, the subscriber account update process 206 creates a new account to correspond to the associated new ANI, updates the account that is based upon the impacted ANI to refer to the new account, and stores the updated accounts in the accounts database 202. These updated accounts are then automatically replicated and distributed via the data replication and distribution system 203 to the various NIDS servers 204. When the subscriber account update process 206 detects that a mandatory dialing period has occurred for an NPA split, the subscriber account update process 206 deletes the subscriber accounts that correspond to the now-obsolete ANIs.

The NPA split tables 205 include, for each scheduled NPA split, permissive and mandatory dialing period information, as well as conversion information for converting existing area code and exchange combinations to new area code and exchange combinations. The NPA split tables 205 can be implemented as a database, using any well-known database technique, or can be implemented using other persistent data storage, for example, records sequentially stored in a file. In addition, the NPA split tables 205 may be stored on a separate memory, or may be integrated into other components of the administrative computer system.

Figure 3:
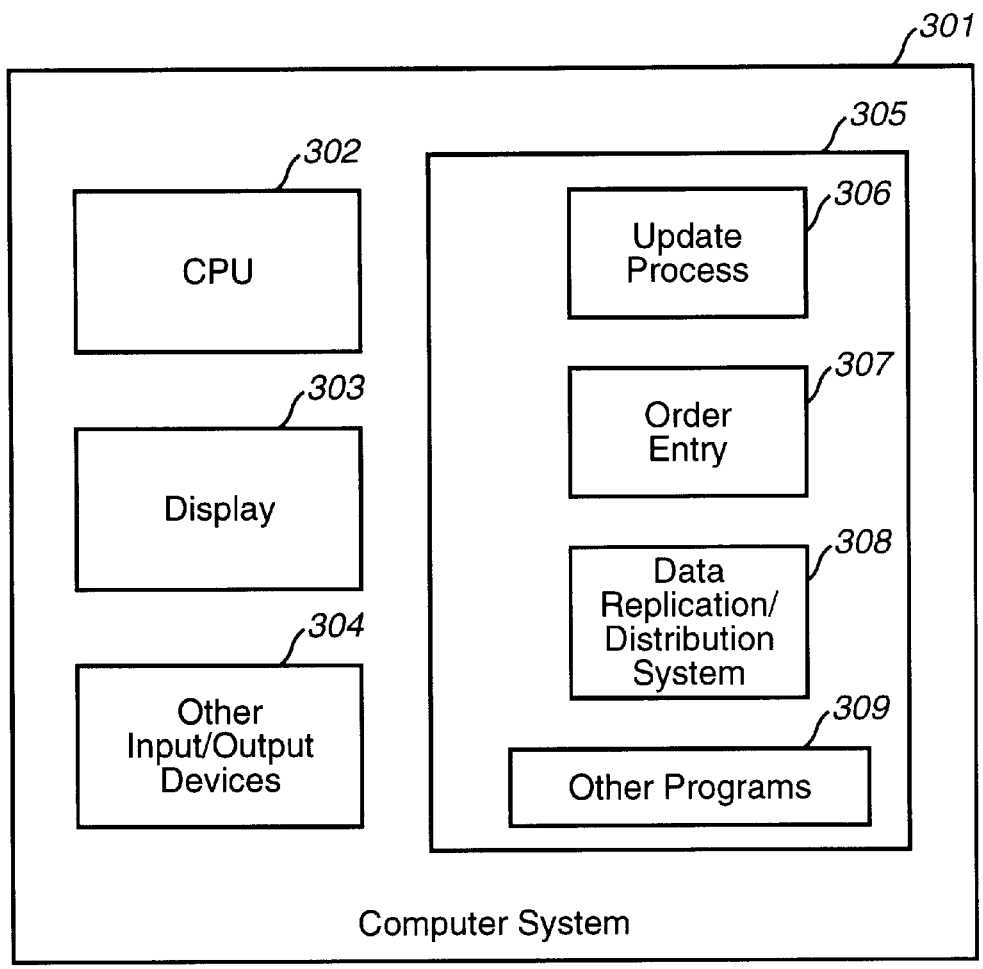
FIG. 3 is a block diagram of a general purpose computer system for practicing embodiments of the subscriber account update process.

In exemplary embodiments, the administrative computer system, which includes the automated subscriber account update process, is implemented on a computer system comprising a central processing unit, a display, a memory, and other input/output devices. Exemplary embodiments of the administrative computer system or design to operate in a globally networked environment, such as the telecommunications network illustrated in FIG. 1. FIG. 3 is a block diagram of a general purpose computer system for practicing embodiments of the subscriber account update process. The computer system 301 contains a central processing unit (CPU) 302, a display 303, a computer memory (memory) 305, or other computer-readable memory medium, and other input/output devices 304. The executable code of the subscriber account update process preferably resides in the memory 305 and executes on the CPU 302. The executable code of the subscriber account update process 306 is shown residing in the memory 305 along with the order entry system 307, and the data replication and distribution system 308. Other programs 309 also reside in the memory 305. The NPA split tables and subscriber accounts database are part of the other input/output devices 304. One skilled in the art will recognize that an exemplary subscriber account update process can also be implemented in a distributed environment where the various programs shown as currently residing in the memory 305 are instead distributed among several computer systems. For example, the order entry system 307 may reside on a different computer system than the update process 306. In addition, the NPA split tables and the accounts database may each reside on their own computer systems.

Figure 4A:
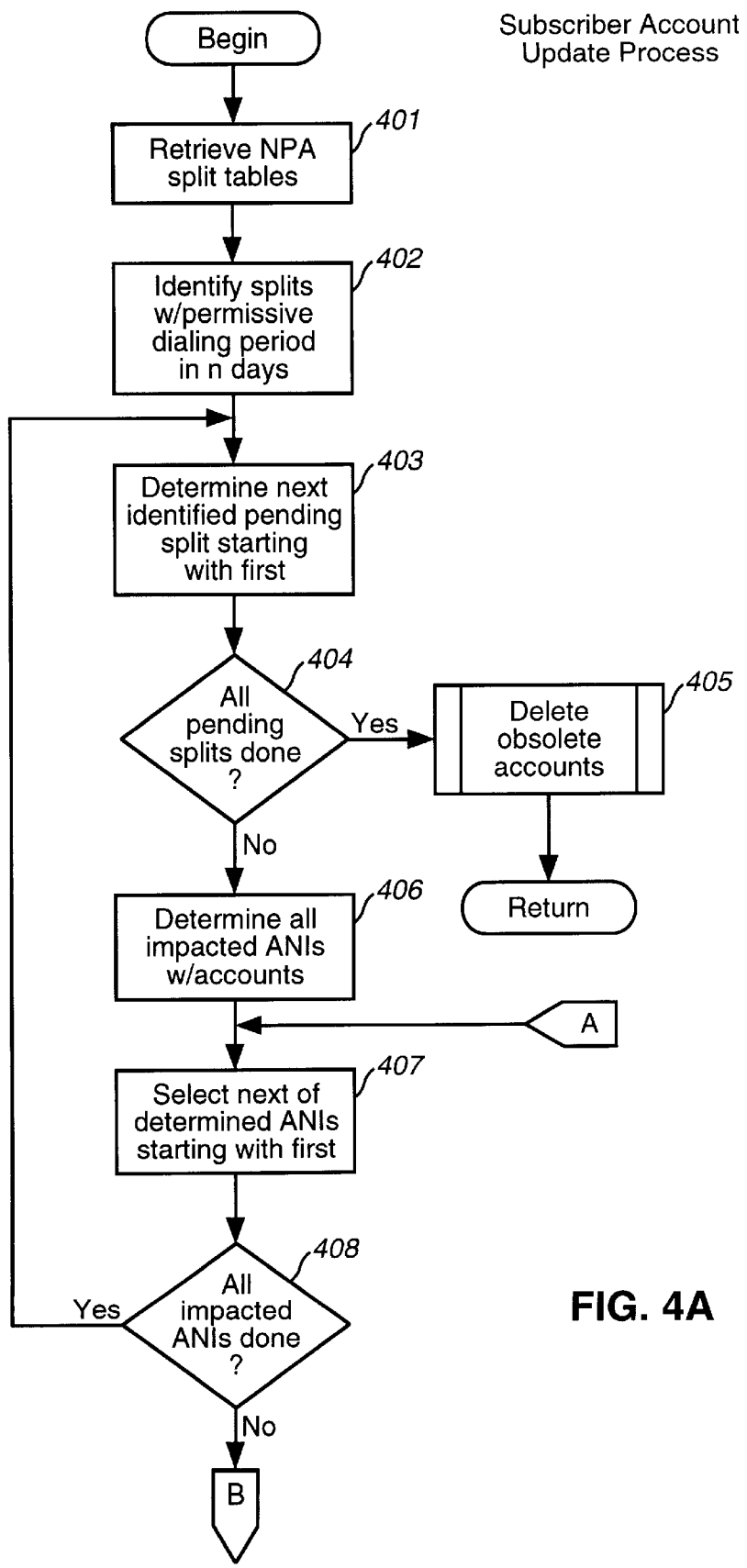
FIGS. 4A and 4B are flow diagrams of the steps performed by an exemplary subscriber account update process to automatically accommodate numbering plan changes.
Figure 4B:
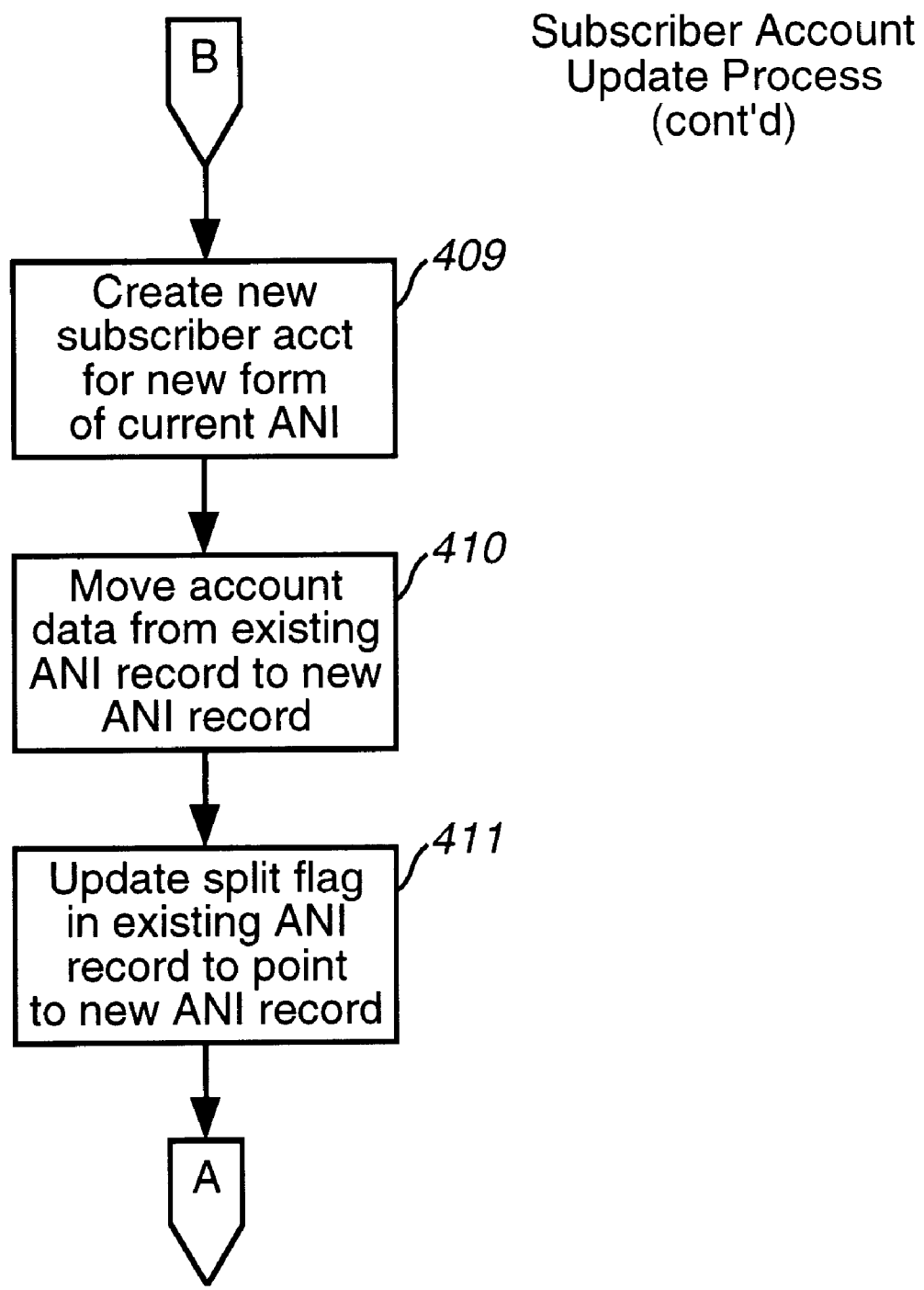

FIGS. 4A and 4B are flow diagrams of the steps performed by an exemplary subscriber account update process to automatically accommodate numbering plan changes. As briefly described above, the update process determines pending NPA splits, updates the account information for the impacted ANIs accordingly, and deletes obsolete accounts. The subscriber account update process is discussed with reference to NPA splits as an example. These same steps are applicable to other numbering plan changes and other types of telephone number identifiers as discussed earlier.

Specifically, in step 401, the subscriber account update process retrieves the NPA split tables (e.g., the NPA split tables 205 in FIG. 2). In step 402, the update process identifies pending NPA splits, which are those NPA splits scheduled to begin within some (specifiable) number of days. The start date for an NPA split can be determined by the start date of the permissive dialing period scheduled for the NPA split. Typically, local exchange carriers and other switching networks publicize the permissive dialing period and mandatory dialing period start dates for each scheduled NPA split, even though they do not provide information regarding the exact ANI cutover times for individual telephone numbers. The logical layout of the NPA split tables is discussed further below with respect to FIG. 5.

Steps 403–411 implement a loop to update subscriber accounts for each pending NPA split. In step 403, the update process identifies the next pending NPA split to process starting with the first identified split. In step 404, if there are no more pending splits to process, then the update process continues in step 405, else continues in step 406. In step 405, the update process deletes all of the obsolete accounts for the identified pending NPA split. The steps used to perform this deletion are discussed further below with reference to FIG. 7. After deleting obsolete accounts, the update process returns. In step 406, the update process determines all of the ANIs that are impacted by the identified pending NPA split and that index subscription service accounts. The impacted ANIs can be determined from the NPA split table that corresponds to the identified pending NPA split. Impacted ANIs are ANIs whose area code and exchange sequence is listed in the NPA split table. Once the impacted ANIs are determined, a database query may be used to determine the impacted ANIs that index subscription service accounts.

Steps 407–411 implement an inner loop to process all the impacted ANIs of an identified pending NPA split that index subscriber service accounts. Specifically, in step 407, the subscriber account update process selects the next of these determined ANIs starting with the first. In step 408, the update process determines whether it has processed all of these ANIs and, if so, continues back to the beginning of the outer loop to identify the next pending NPA split in step 403, else continues in step 409. In step 409, the update process creates a new subscriber service account based upon the new ANI that corresponds to the impacted ANI. Sufficient information to determine the new ANI from the impacted ANI is contained in the conversion information of the NPA split table for the pending NPA split. In step 410, the subscriber account update process moves the account data from the account records that correspond to the impacted ANI to the newly-created subscriber service account. Depending upon the actual organization of the account data, the data may be copied or moved. An example logical arrangement of the subscriber service accounts and account information is described further below with reference to FIG. 6. One skilled in the art will recognize that any arrangement of the account data may be utilized and that steps 409 and 410 would be modified accordingly. In an exemplary embodiment, the service-specific information is deleted from the original account to avoid problems in maintaining current service data in two accounts. In step 411, the update process updates the subscriber service account indexed by the impacted ANI to refer to the newly-created subscriber service account, and then continues back to the beginning of the inner loop to process the next determined ANI in step 407.

Figure 5:
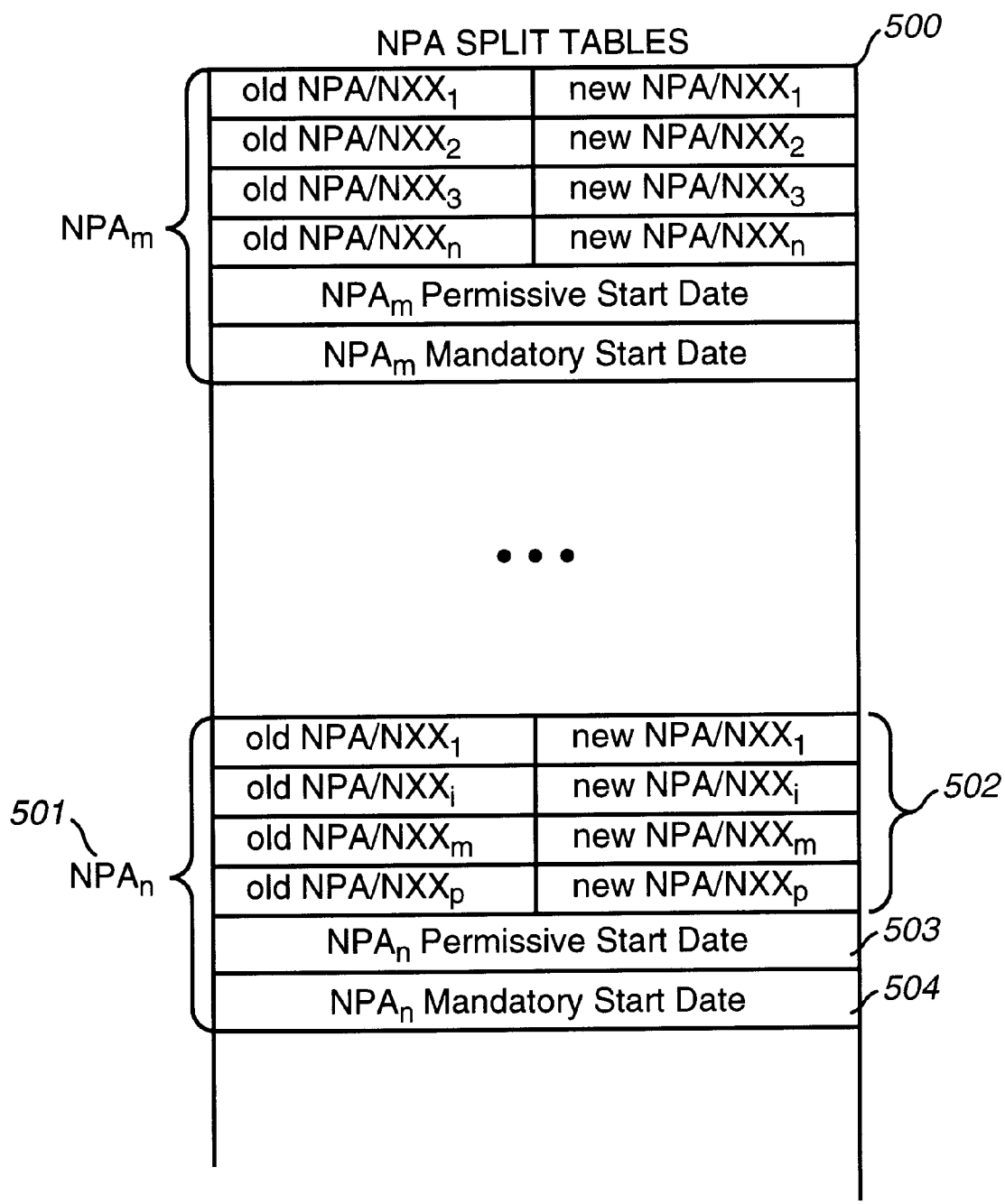
FIG. 5 is an example logical layout of NPA split tables used by exemplary embodiments of the present invention.

FIG. 5 is an example logical layout of NPA split tables used by exemplary embodiments of the present invention. The NPA split tables 500 may be arranged according to any type of table-oriented data structure, including a database with separate tables for each planned NPA split, or a database with a single table with an entry for each NPA split. Alternatively, any persistent data structure for maintaining related information for NPA splits may be used, including persistently stored arrays, lists and other table-oriented data structures. $NPA_n$ 501 is an example NPA split table. $NPA_n$ split table 501 contains conversion information 502 for converting existing area code and exchange combinations (e.g., $NPA/NXX_i$ pairs) into new area code and exchange combinations that will result from the NPA split. In addition, for each NPA split, the table indicates a start date for the permissive dialing period 503 and a start date for the mandatory dialing period 504. The permissive start date 503 is used by the subscriber account update process to determine when an NPA split is to be considered a pending NPA split. As mentioned, NPA splits that are within a certain number of days, which are specifiable by the update process, are considered pending NPA splits. During the permissive dialing period, both impacted (existing) ANIs and their corresponding new ANIs can be used to access subscriber service accounts. The mandatory dialing period, which starts on the indicated mandatory period start date 504, is used by the subscriber account update process to determine when subscriber service accounts for impacted ANIs are obsolete and thus should be deleted.

Figure 6:
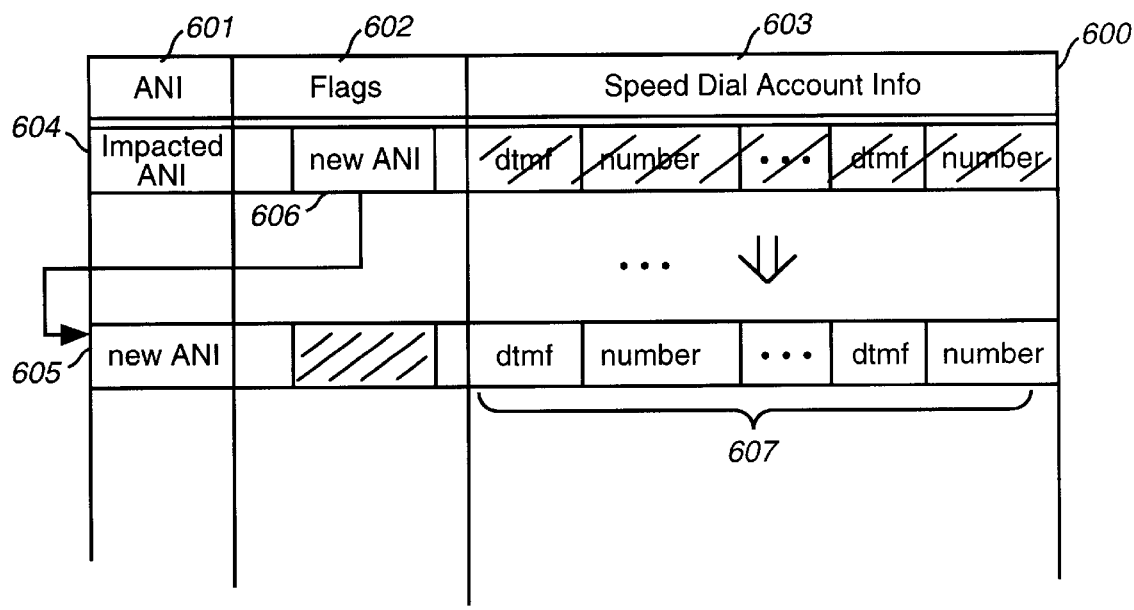
FIG. 6 is an example logical layout of a subscriber service account table arranged according to subscriber ANIs.

FIG. 6 is an example logical layout of a subscriber service account table arranged according to subscriber ANIs. A subscriber service account table 600 includes an ANI field 601, a set of flag fields 602, and account information fields 603, such as the account information that corresponds to a speed dial service. Although shown as a single account table, one skilled in the art will recognize that the various fields shown in the subscriber service account table 600 may be further divided into multiple tables. For example, a table containing only the flags that correspond to accounts may be stored separately from the service-specific account information 603. In addition, when more than one service is provided, the account information for each service may be stored in its own table, indexed by the ANI field.

The subscriber service account table 600 currently shows examples of an existing service account record 604 and a newly-created account record 605 after they have been automatically updated by the subscriber account update process in steps 409–411 in FIG. 4B. Specifically, when a new subscriber service account 605 is created for a new ANI that corresponds to an impacted ANI (see e.g., step 409 in FIG. 4B), the account information (for example, the speed dial account information for that particular subscriber) is moved from the old subscriber account record 604 to the account information fields 607 of the new subscriber account record 605. FIG. 6 shows the account data from the subscriber service account record 604 after it has been moved to the newly-created subscriber service account record 605 (see e.g., step 410 in FIG. 4). Account information that corresponds to the speed dial service is currently shown in account information fields 607. These fields contain pairs of DTMF code/destination number, which are used to determine the telephone number to automatically dial. Depending upon the organization of the data in the service accounts, the account information may be moved or may be copied. For example, if separate tables are provided for the flags 602 and the speed dial account information 603, it may be more expeditious for maintenance reasons to actually copy the information into the corresponding entries in the new subscriber account record 605 and to delete the information that was copied from the existing subscriber account record 604, thus "moving" the data. For the purposes of this specification, the term "copy" will refer to copying the data to the new record whether or not the data that was copied is deleted. In addition to moving the account data, the update process has inserted a split flag 606 into the existing subscriber service account record 604 to refer to the newly-created subscriber service account record 605 (see e.g., step 411 in FIG. 4). The split flag 606 enables a subscriber to access the account information 607, which is stored under the new ANI, using either the impacted ANI or the new ANI.

Figure 7:
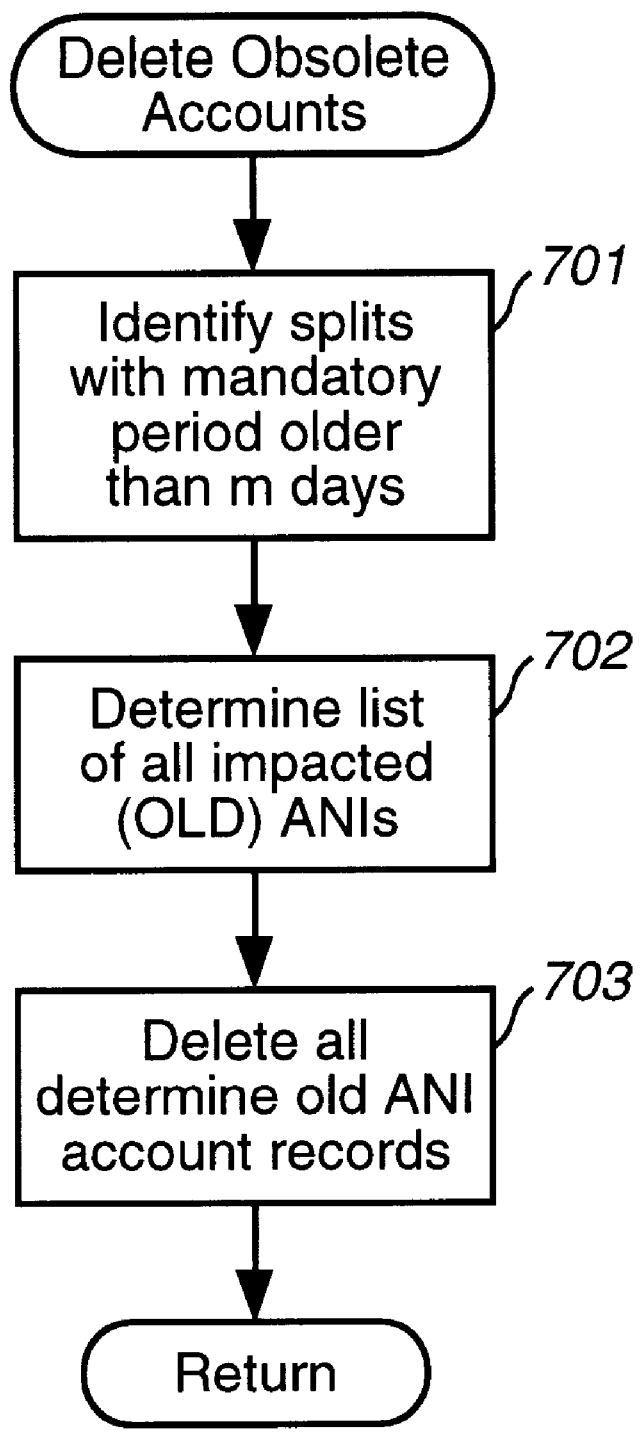
FIG. 7 is an example flow diagram of the steps performed by the subscriber account update process to delete obsolete accounts.

FIG. 7 is an example flow diagram of the steps performed by the subscriber account update process to delete obsolete accounts. These steps correspond to step 405 in FIG. 4A and may be executed at a different time than that shown in FIGS. 4A and 4B. Further, these steps may be implemented in a separate thread or process. Obsolete accounts are deleted on a periodic basis by the subscriber account update process. In step 701, the update process identifies NPA splits from the NPA split tables that have mandatory period start dates that are older than a certain (specifiable) number of days. Once the mandatory dialing period for a split begins, all impacted ANIs have been cutover to their corresponding new ANIs, and subscribers are required to use the new ANIs to access subscriber service accounts. In step 702, the subscriber account update process determines a list of all of the impacted (now obsolete) ANIs. Referring to FIG. 5, the obsolete ANIs can be determined for a particular NPA split using the area code and exchange information contained in the conversion information fields 502. For example, if a particular area code and exchange combination is now obsolete, then, assuming the account tables are implemented in a database, a query can be executed to determine all of the records having ANIs that include that combination of area code and exchange. In step 703, the update process deletes all of the subscriber service account records that correspond to the determined (obsolete) accounts. Assuming a database implementation as above, this step can be performed by deleting the records retrieved in step 702.

Figure 8:
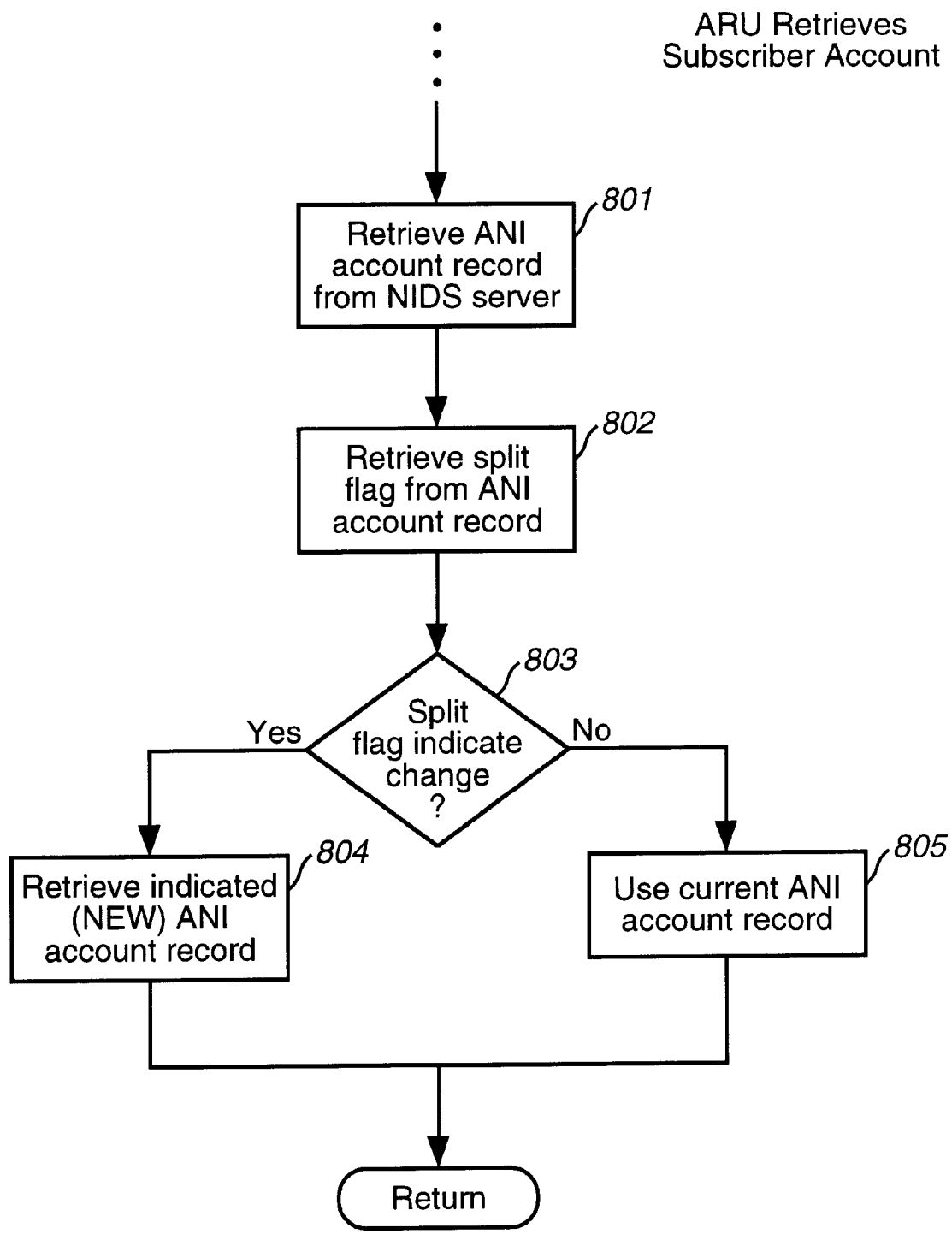
FIG. 8 is an example flow diagram of the modifications made to an ARU to be used with embodiments of the present invention to retrieve subscriber accounts.

FIG. 8 is an example flow diagram of the modifications made to an ARU to be used with embodiments of the present invention to retrieve subscriber accounts. After performing some number of other steps to process a subscriber service request, the ARU is ready to retrieve an account record for a particular subscriber. In step 801, the ARU retrieves from an NIDS server (e.g., a NIDS server 110 in FIG. 1) the subscriber service account record that corresponds to the ANI indicated in the customer request. In step 802, the ARU retrieves the NPA split flag (e.g., split flag 606 in FIG. 6) from the retrieved account record and determines whether it indicates that the account now corresponds to a different subscriber service account (for example, by indicating a different ANI). In step 803, if the split flag indicates a different subscriber account, then the ARU continues in step 804, else continues in step 805. In step 804, the ARU retrieves the account record indicated by the NPA split flag, and returns. Otherwise, in step 805, the ARU retrieves the account information from the currently retrieved record, and then returns.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to other types of numbering plan changes and other types of telephone number identifiers, not necessarily the exemplary NDA splits and ANIs. In addition, the teachings may be applied to other types of subscriber services and other organizations of account information. These and other changes may be made to the invention in light of the above detailed description. Accordingly, the invention is not limited by the disclosure, but instead the scope of the present invention is to be determined by the following claims.

We claim:

1. A method for automatically updating subscriber service account information in a telecommunications network to accommodate a number plan area ("NPA") split, each subscriber service account being identified by a telephone number identifier, the method comprising:

determining whether the NPA split is scheduled to begin within a specified time and is thus a pending NPA split;

when it is determined that the NPA split is a pending NPA split, automatically generating a list of impacted telephone number identifiers, each impacted telephone number identifier identifying an existing subscriber service account; and for an impacted telephone number identifier in the generated list, automatically, determining a corresponding new telephone number identifier that will be used by the telecommunications network in accordance with the pending NPA split;

creating a new subscriber service account identified by the corresponding new telephone number identifier;

retrieving account information from the existing subscriber service account;

inserting the retrieved account information into the new subscriber service account; and updating the existing subscriber service account to include a reference to the new subscriber service account, such that the subscriber service account information of the new subscriber service account is accessible using both the impacted telephone number identifier and the corresponding new telephone number identifier.

2. The method of claim 1, further comprising:

determining whether the NPA split has occurred;

when it is determined that the NPA split has occurred, automatically, generating a list of obsolete telephone number identifiers, each obsolete telephone number identifier identifying an obsolete subscriber service account; and for each obsolete telephone number identifier, deleting the identified obsolete service account.

3. The method of claim 2 wherein the NPA split has occurred when a mandatory dialing period associated with the NPA split has started.

4. The method of claim 1, further comprising:

during a period of permissive dialing associated with the NPA split, when a request for account information is received that uses a new telephone number identifier, retrieving the account information from the created new subscriber service account that is identified by the new telephone number identifier; and when a request for account information is received that uses an existing telephone number identifier, retrieving the account information from the created new subscriber service account that is identified by the new telephone number identifier that corresponds to the existing telephone number identifier.

5. The method of claim 4, further comprising:

during a period of mandatory dialing associated with the NPA split, when a request for account information is received that uses a new telephone number identifier, retrieving the account information from the created new subscriber service account that is identified by the new telephone number identifier; and when a request for account information is received that uses an existing telephone number identifier, returning an error.

6. The method of claim 1 wherein the determination of whether the NPA split is a pending NPA split is performed using a table of NPA split entries that includes, for each NPA split entry, an indication of the beginning of a permissive dialing period, an indication of the beginning of a mandatory dialing period, and an indicator of the telephone number identifiers impacted.

7. The method of claim 1 wherein the new subscriber service accounts and the updated existing subscriber service accounts are distributed automatically within the telecommunications network.

8. The method of claim 1 wherein the subscriber service account information pertains to speed dialing.

9. The method of claim 1 wherein the subscriber service account information pertains to a dual tone multiple frequency driven service.

10. The method of claim 1 wherein the subscriber service accounts are stored in a database.

11. The method of claim 1 wherein each telephone number identifier is an ANI that identifies the origination of the call.

12. The method of claim 1 wherein a subscriber service account is accessed by dialing a designated telephone number and by sending a telephone number identifier that identifies the caller and an indication of the account information desired.

13. A computer system in a telecommunications network for automatically updating a plurality of subscriber service accounts to accommodate a numbering plan change, the system comprising:

numbering plan change information that specifies a permissive dialing period and an indication of telephone number identifiers that are impacted by the numbering plan change;

an automatic update process that
  generates a list of impacted telephone number identifiers using the indication of telephone number identifiers in the numbering plan change information, each impacted telephone number identifier in the list identifying an existing subscriber service account; and for each impacted telephone number identifier in the list,
    creates a new subscriber service account for a new telephone number identifier that corresponds to the impacted telephone number identifier;
    copies account information from the existing subscriber service account into the new subscriber service account; and
    inserts an indicator of the new subscriber service account into the existing subscriber service account, so that both the impacted telephone number identifier and the corresponding new telephone number identifier can be used to access the account information of the new subscriber service account during the permissive dialing period indicated by the numbering plan change information.

14. The computer system of claim 13 wherein the numbering plan change information specifies a mandatory dialing period, and wherein, after the mandatory dialing period is in effect, the automatic update process deletes subscriber service accounts that are obsolete, so that the impacted telephone number identifiers on the generated list can no longer be used to access the account information of the new subscriber service accounts.

15. The computer system of claim 13 wherein the automatic update process is executed on a periodic basis.

16. The computer system of claim 13 wherein the numbering plan change corresponds to a change in an area code designation portion of a plurality of telephone numbers.

17. The computer system of claim 13 wherein a telephone number identifier is an ANI.

18. The computer system of claim 13 wherein the subscriber service accounts are associated with speed dialing information.

19. The computer system of claim 13 wherein the subscriber service accounts are associated with an automated service driven by dual tone multiple frequency codes.

20. The computer system of claim 13 wherein the numbering plan change information is stored in a database.

21. A method for accessing subscriber service account information in a telecommunications network without interruption in subscriber service, the method comprising:

periodically, automatically updating subscriber service accounts by determining pending numbering plan changes;

for each pending numbering plan change and for each existing subscriber service account identified by an impacted telephone number identifier that is impacted by the pending numbering plan change,
  creating a corresponding new subscriber service account containing account information retrieved from the existing subscriber service account, the new subscriber service account being identified by a new telephone number identifier; and
  updating the existing subscriber service account to contain an indicator to the corresponding new subscriber service account;

during a period of permissive dialing for a pending numbering plan change, allowing access to account information using the impacted telephone number identifiers and allowing access to account information using the new telephone number identifiers; and after a mandatory dialing period begins for a pending numbering plan change, not allowing access to account information using impacted telephone number identifiers.

22. The method of claim 21 wherein a telephone number identifier is an ANI.

23. The method of claim 21 wherein the numbering plan change is an NPA split.

24. The method of claim 21 wherein account information pertains to speed dialing services.

25. The method of claim 21 wherein the updated subscriber service accounts are replicated and distributed to a plurality of locations in the telecommunications network.

* * * * *